United States Patent [19]

Ashby et al.

[11] Patent Number: 4,506,058
[45] Date of Patent: Mar. 19, 1985

[54] SELF-BONDING ROOM TEMPERATURE VULCANIZABLE SILICONE COMPOSITIONS

[75] Inventors: Bruce A. Ashby, Schenectady; Gary M. Lucas, Scotia, both of N.Y.

[73] Assignee: General Electric Company, Waterford, N.Y.

[21] Appl. No.: 589,429

[22] Filed: Mar. 14, 1984

[51] Int. Cl.³ .............................................. C08K 5/54
[52] U.S. Cl. ...................... 524/730; 528/17; 528/18; 528/33; 528/34; 528/901
[58] Field of Search ................. 524/730; 528/17, 18, 528/33, 34, 901

[56] References Cited

U.S. PATENT DOCUMENTS

| | | | |
|---|---|---|---|
| 2,928,858 | 3/1960 | Morehouse | 260/448.8 |
| 3,033,815 | 5/1962 | Pike et al. | 260/46.5 |
| 3,168,544 | 2/1965 | Jex | 260/448.2 |
| 3,208,971 | 9/1965 | Gilkey et al. | 556/421 |
| 3,554,952 | 1/1971 | Plueddemann | 260/29.2 |
| 3,558,556 | 1/1971 | Berger et al. | 260/46.5 |
| 3,668,229 | 6/1972 | Berger et al. | 260/448.8 R |
| 3,671,562 | 6/1972 | Pepe et al. | 260/448.8 R |
| 3,700,716 | 10/1972 | Berger et al. | 260/448.2 N |
| 3,702,860 | 11/1972 | Krahnke | 260/448.8 R |
| 3,754,971 | 8/1973 | Pepe et al. | 117/72 |
| 3,888,815 | 6/1975 | Bessmer et al. | 260/37 SB |
| 4,026,880 | 5/1977 | Mitchell | 260/239 E |
| 4,209,455 | 6/1980 | Pepe | 556/419 |
| 4,395,507 | 7/1983 | Dziark et al. | 524/730 |

*Primary Examiner*—Melvyn I. Marquis
*Attorney, Agent, or Firm*—Gary L. Loser

[57] ABSTRACT

There is provided a composition which vulcanizes at room temperature on exposure to moisture comprising a product resulting from mixing:

(A) an organopolysiloxane consisting essentially of repeating $R_2SiO$ units, where R is a $C_{(1-13)}$ monovalent substituted or unsubstituted hydrocarbon radical;

(B) an effective amount of condensation catalyst, and (C) an effective amount of self-bonding agent of the general formula

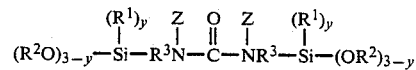

where $R^1$ is a $C_{(1-7)}$ monovalent hydrocarbon radical, $R^2$ is a $C_{(1-4)}$ alkyl radical, $C_{(1-4)}$ acyl radical or a radical of the formula $-CH_2CH_2O)_nR^4$, where n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical and y equals 0 or 1.

25 Claims, No Drawings

SELF-BONDING ROOM TEMPERATURE VULCANIZABLE SILICONE COMPOSITIONS

BACKGROUND OF THE INVENTION

The present invention relates to room temperature vulcanizable silicone elastomeric compositions. More particularly, the present invention relates to room temperature vulcanizable silicone compositions which cure upon exposure to atmospheric moisture to self-bonding silicone elastomeric compositions.

Room temperature vulcanizable silicone elastomeric compositions curable through a number of mechanisms are known in the art. Of special interest in the present application are room temperature vulcanizable silicone elastomers which cure upon exposure to moisture through hydrolyzable functionality. These materials are generally prepared by mixing an organopolysiloxane, which is primarily a diorganopolysiloxane, containing silicon-bonded hydroxyl groups with a suitable cross-linking agent either in the presence or absence of added filler, plasticizers, sag control agents and the like. Perhaps the best example of such a composition is disclosed in U.S. Pat. No. 4,395,526 to White et al. which is incorporated by reference into the instant disclosure.

While these room temperature vulcanizable silicone elastomers are extremely useful and commercially successful, the adhesion of these materials to various substrates provides a continuing problem. One approach to provide the necessary adhesion of silicone elastomeric materials to all types of substrates has been the development of priming systems. Such priming systems are undesirable in that they require additional steps and additional time in the process of bonding surfaces together.

The preferred approach is to include self-bonding agents in the room temperature vulcanizable silicone composition so that the cured elastomeric composition will satisfactorily adhere to the substrate without the need for a priming system.

Bessmer et al. in U.S. Pat. No. 3,888,815 discloses a self-bonding room temperature vulcanizable silicone rubber composition comprising a linear organopolysiloxane, a filler, an alkyl silicate or a hydrolyzate product of an alkyl silicate and, as a self-bonding agent, a nitrogen functional silane of the formula

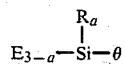

where R is selected from the group consisting of monovalent hydrocarbon radicals and halogenated monovalent hydrocarbon radicals, E is a hydrolyzable radical selected from the group consisting of alkoxy, phenoxy, halo, aminodialkylamino and tertiary hydroperoxy, and θ is a saturated, unsaturated or aromatic hydrocarbon residue functionalized by a member selected from the group consisting of amino, carbonyl, carboxy, isocyano, azo, diazo, thio, thia, dithia, isothiocyano, oxo, oxa, halo, ester, nitrose, sulfhydryl, hydrocarbonylamido and sulfamido and mixtures thereof, and wherein a is a whole number that varies from 0 to 2. Among the commercially more successful self-bonding agents within the scope of Bessmer et al. are gamma-aminopropyltrimethoxysilane and gamma-aminopropyltriethoxysilane.

Pike et al., U.S. Pat. No. 3,033,815, is concerned with the synthesis of organosilicon compounds containing among other possible functional groups a substituted amino group linked to the silicon atom or atoms thereof through an alkylene linkage of at least three carbon atoms and to such organosilicon compounds as new compositions of matter. Such compounds are said to be useful as sizes for fibrous materials, particularly fibrous glass materials employed in combination with thermosetting resins. Both the monomeric and polymeric compounds are also useful as adhesives or as flocculation agents.

Gilkey et al. in U.S. Pat. No. 3,208,971, discloses bis-silyl urea compounds of the general formula

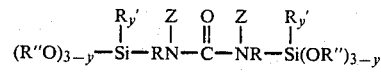

in which R″ is an alkyl radical or acyl radical of from 1 to 4 carbon atoms or a radical of the formula —CH$_2$CH$_2$O)$_n$R‴ in which n is 1 or 2 and R‴ is an alkyl radical of from 1 to 4 carbon atoms, R′ is a monovalent hydrocarbon radical of less than 7 carbon atoms, y has an average value from 0 to 3 inclusive, R is a divalent hydrocarbon radical free of aliphatic unsaturation and having from 1 to 18 carbon atoms which is attached to the nitrogen atom of the urea nucleus through a non-aromatic carbon atom and Z is hydrogen or a lower alkyl radical. Such compositions, which are within the scope of the self-bonding agens of the present invention, are said to be useful as adhesives, coatings and as sizing agents for siliceous materials (i.e. the application of such compositions to a siliceous material improves the bond between the siliceous material and organic resins). In addition, such organosilicon compounds are said to be capable of copolymerization with aminoplast resins to form compositions suitable as coatings and bonding agents.

Pepe et al., U.S. Pat. No. 3,671,562, discloses silicon compounds characterized by the presence of a radical of the formula

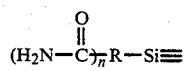

wherein at least one of the three free valences of the silicon atom are bonded directly to hydrolyzable groups such as alkoxy, aryloxy, amino and the like, and/or oxygen which in turn is bonded to other silicon atoms to form a siloxane. These compounds, and more particularly aqueous solutions of the hydrolyzate of the urea substituted silanes, or the partially or totally condensed siloxanes employed neat or in solution, are effective coupling agents, particularly on fiberglass for further reaction with a broad variety of thermosetting and/or thermoplastic resins.

SUMMARY OF THE INVENTION

It is an object of the present invention to provide a novel self-bonding room temperature vulcanizable silicone composition.

It is another object of the present invention to provide a process for preparing a novel self-bonding room temperature vulcanizable silicone composition.

It is still another object of the present invention to provide a novel method for making bis-silyl ureas which are useful as self-bonding agents in room temperature vulcanizable silicone copositions.

The addition of bis-silyl urea compounds to moisture curable, room temperature vulcanizable silicone compositions improves the adhesion of the cured elastomer to various substrates which do not include such compounds therein. Moreover, the addition of bis-silyl urea compounds to moisture curable, room temperature vulcanizable silicone compositions in place of the gamma-aminopropyl-trimethoxysilane as taught by Bessmer et al., U.S. Pat. No. 3,888,815, results in substantially equivalent or slightly superior adhesion to most substrates.

Bis-silyl urea compounds useful as self-bonding agents in the room temperature vulcanizable silicone compositions of the present invention can be prepared by reacting a gamma-isocyanatoalkyltrialkoxysilane with a gamma-aminoalkyltrialkoxysilane, for example, gamma-isocyanatopropyltrimethoxysilane with gamma-aminopropyltrimethoxysilane.

DESCRIPTION OF THE INVENTION

In accordance with the present invention there is provided a silicone composition which is storage stable in the substantial absence of moisture and which composition vulcanizes at room temperature on exposure to moisture comprising a product resulting from mixing (A) an organopolysiloxane consisting essentially of repeating units of the formula

where R is a $C_{(1-13)}$ monovalent substituted or unsubstituted hydrocarbon radical and where the viscosity of the organopolysiloxane is at least 100 centipoise at 25° C., (B) an effective amount of condensation catalyst and (C) an effective amount of self-bonding agent of the general formula

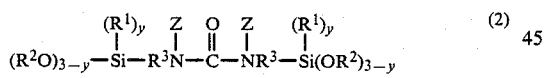

where $R^1$ is a $C_{(1-7)}$ monovalent hydrocarbon radical, $R^2$ is a $C_{(1-4)}$ alkyl radical, acyl radical or a radical of the formula $-CH_2CH_2O)_nR^4$ in which n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical and y equals 0 or 1.

Generally organopolysiloxane (A) can be any organopolysiloxane consisting essentially of repeating units of formula (1) and which is terminated with radicals which will effect crosslinking upon exposure to moisture. Such organopolysiloxanes are well known to those skilled in the art, but of particular interest in the present invention are organopolysiloxanes wherein the silicon atom at each chain end is silanol terminated or terminated with at least two alkoxy radicals. By terminated with at least two alkoxy radicals is meant that most terminal silicon atoms have two or more alkoxy groups. It is of course possible to have a certain number of monoalkoxy terminated organopolysiloxanes in accordance with the teaching of Lucas, Ser. No. 449,105, filed Dec. 13, 1982. For the reader interested in obtaining more detailed information, reference should be made to U.S. Pat. No. 4,395,526, White et al., which is incorporated by reference not only for its teaching of suitable organopolysiloxane base polymers and their methods of preparation, but also for its teaching relating to condensation catalysts and scavengers for hydroxy functional groups, discussed more fully hereinbelow. The skilled artisan can readily determine which other organopolysiloxanes are suitable for practicing the present invention without undue experimentation.

Effective amounts of condensation catalysts which can be used in the practice of the present invention to facilitate the cure of the room temperature vulcanizable compositions are, for example, from about 0.001 to about 1 part based on the weight of 100 parts by weight of organopolysiloxane (A). Preferably the condensation catalyst is a tin compound such as dibutyltindilaurate, dibutyltindiacetate, dibutyltindimethoxide, stannous octoate, stannous oleate, stannous naphthenate and the like. Dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate, tetrabutyltitanate and the like. In addition, beta-dicarbonyltitanium compounds as shown in Weyenberg, U.S. Pat. No. 3,334,067, can be used as condensation catalysts in the present invention. Additional catalysts which are well known in the art are provided in a rather exhaustive list in U.S. Pat. No. 4,395,526, White et al. Of course, there may be utilized mixtures of suitable condensation catalysts.

The present invention is based on the surprising discovery that a self-bonding room temperature vulcanizable composition is obtained when an effective amount of a bis-silyl urea compound of formula (2) is also included in the RTV composition. Generally an effective amount of self-bonding agent of formula (2) ranges from about 0.1 to about 10 parts by weight per 100 parts by weight of organopolysiloxane (A).

As indicated hereinabove, it is necessary that the bis-silyl urea self-bonding agent of the present invention have two or three $OR^2$ radicals bonded to each silicon atom and preferably there are three $OR^2$ radicals bonded to each silicon atom. Also it is preferable that $R^2$ be a methyl or ethyl group; e.g. each silicon atom preferably has three methoxy or ethoxy radicals bonded thereto. However, $R^2$ can generally be any alkyl radical of 1 to 4 carbon atoms such as methyl, ethyl, isopropyl, butyl or t-butyl; or any acyl radical of 1 to 4 carbon atoms such as formyl, acetyl or propionyl; or any alkoxyethyl radical such as β-methoxyethyl, β-ethoxyethyl or β-butoxyethyl; or any radical of the formula $-CH_2CH_2O)_nR^4$ where n and $R^4$ are as previously defined such as $-CH_2CH_2O)_2CH_3$ or $-CH_2CH_2O)_2C_4H_9$.

$R^1$, if present, can be any monovalent hydrocarbon radical of up to 7 carbon atoms such as methyl, ethyl, hexyl, vinyl, allyl, hexenyl, phenyl, cyclohexyl, cyclopentyl and cyclopentenyl.

$R^3$ can be any divalent hydrocarbon radical free of aliphatic unsaturation such as

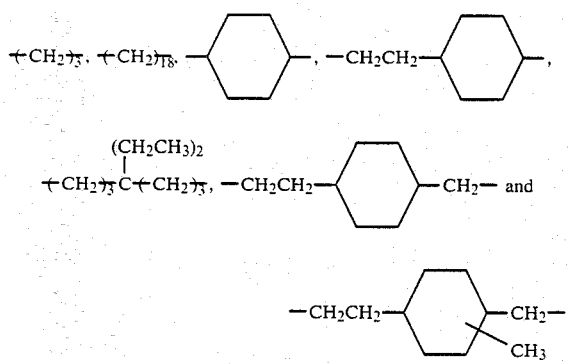

Most preferably $R^3$ is propyl.

Z can be hydrogen or a lower alkyl radical such as methyl, ethyl, isopropyl or butyl. Preferably Z is hydrogen.

As can be gathered from the foregoing, the most preferred self-bonding agent for practicing the present invention has the formula

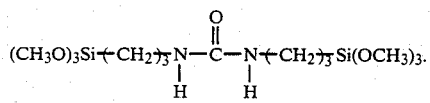

Other bis-silyl urea compounds effective for practicing the present invention can readily be determined from the foregoing formula (2) and related description without undue experimentation on the part of the artisan.

Methods for preparing bis-silyl urea compounds within the scope of the present invention are known in the art. Gilkey et al., U.S. Pat. No. 3,208,971, which is incorporated into the present disclosure for its various methods for preparing bis-silyl urea compounds, teaches the art that bis-silyl urea compounds are best prepared by reacting silylamines of the formula

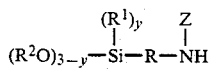

with urea by heating a mixture of the two in a proportion of at least two moles of silane per mole of urea. The reaction proceeds upon heating the mixture at temperatures above 125° C. with the elimination of two moles of ammonia per mole of urea.

The present applicants have found that bis-silyl urea compounds effective for practicing the present invention can also be prepared by a novel and unobvious method which involves mixing a compound of the formula

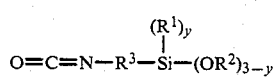

with a compound of the formula

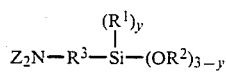

where $R^1$, $R^2$, $R^3$ and y are as previously defined.

In practicing the process of the present invention for preparing bis-silyl urea compounds a compound of formula (3) is mixed with approximately an equimolar amount of a compound of formula (4). Such reaction mixture is agitated, for example, by swirling, to effect reaction. As an illustration of the process of the present invention, Example 1 hereinbelow describes the preparation of the most preferred self-bonding agent of the present invention.

As discussed more fully in the disclosure of U.S. Pat. No. 4,395,526, White et al., there may optionally be included in the room temperature vulcanizable composition of the present invention an effective amount of a crosslinking silane of the formula

where $R^5$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^6$ is a $C_{(1-13)}$ monovalent substituted or unsubstituted hydrocarbon radical, and b equals 0 or 1. Other crosslinking agents which may be suitable in the practice of the present invention can be determined by the skilled artisan without undue experimentation.

Also useful in the practice of the present invention are scavengers for hydroxy functional groups which provide for a more shelf-stable composition. Such scavengers for hydroxy groups, as discussed more fully by White et al. in U.S. Pat. No. 4,395,526, may function both as a crosslinking agent and as a scavenging agent or only as a scavenging agent. Such function will depend on how the terminal silicon atom of the organopolysiloxane chains are endcapped and on the number of hydrolyzable groups in the scavenging silane. Briefly, silanes of the general formula

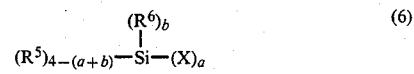

where $R^5$, $R^6$ and b are as previously defined, X is a hydrolyzable leaving group selected from amido, amino, carbamato, enoxy, imidato, isocyanato, oximato, thioisocyanato and ureido radicals, and a is equal to 1 or 2, function as both crosslinking agents and as scavengers for hydroxy groups.

Where polyalkoxy-terminated organopolysiloxane (A) is made without using silane scavenger of formula (6), silane scavenger can be used in the practice of the invention having less than two —$OR^5$ radicals attached to silicon, as shown by the formula,

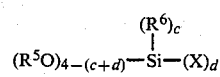

where $R^5$, $R^6$ and X are as previously defined, c is a whole number equal to 0 to 3, inclusive, d is an integer equal to 1 to 4 inclusive, and the sum of c+d is equal to 3 or 4. The reader interested in obtaining more detailed information relating to scavengers and their use in preparing alkoxy endcapped organopolysiloxanes and room temperature vulcanizable silicone compositions is referred to White et al., U.S. Pat. No. 4,395,526, which is incorporated herein for such teaching.

Other scavengers for hydroxy groups are known in the art, though some are useful only as scavengers while others are useful both as scavengers and crosslinking agents. For further details the reader is referred to U.S. Pat. No. 4,417,042 to Dziark; U.S. patent application Ser. No. 338,518, filed Jan. 11, 1982, now U.S. Pat. No. 4,424,157; U.S. patent application Ser. No. 464,443, filed Feb. 7, 1983; and U.S. patent application Ser. No. 428,038, filed Sept. 29, 1982.

Various fillers and pigments can be incorporated into the composition of the present invention such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate and the like. The amount of filler used can vary within wide limits in accordance with the intended use. For example, in some sealant applications the curable compositions of the present invention can be used free of filler. In other applications, such as employment of the curable compositions for making binding material, as much as 700 parts or more of filler per 100 parts by weight or organopolysiloxane (A) may be used.

The compositions of the present invention also can be employed as construction sealants and caulking compounds. The exact amount of filler, therefore, will depend upon such factors as the application for which the composition is intended and the type of filler utilized. Preferably from 10 to 300 parts of filler, which can include up to about 35 parts of a reinforcing filler, such as fumed silica filler, per 100 parts of organopolysiloxane (A) is utilized.

There may also be included in the room temperature vulcanizable composition of the present invention from 0.03 to 2.0 parts by weight of a polyether sag control agent selected from compounds having the formula

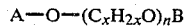

and

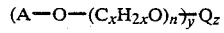

wherein A and B represent radicals selected from the group consisting of hydrogen, alkyl radicals containing from 1 to 12 carbon atoms, cycloalkyl radicals containing from 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms; and

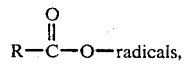

where R is a $C_{(1-11)}$ alkyl radical, Q is a residue of a polyhydric initiator radical containing at least two hydroxyl radicals selected from the group consisting of ethylene glycol, glycerol, trimethylolpropane and other polyhydric alcohols having from 2 to 6 hydroxyl groups, n is a number from 4 to 2000, x is a number from 2 to 4, inclusive, y has a value from 2 to 10, inclusive, and z has a value of from 1 to 5, inclusive. For further details relating to such sag control agents the reader is referred to Wright et al., U.S. Pat. No. 4,261,758, which is incorporated into the instant disclosure by reference.

Of course, other sag control agents which are useful in practicing the present invention, such as castor oil and treated fumed silica, are also within the scope of the appended claims. Still other sag control agents are known to those skilled in the art and their suitability for use in the present invention can be determined by the skilled artisan without undue experimentation.

There can also be incorporated from 1 to 50 parts by weight of a triorganosilyl endstopped diorganopolysiloxane having a viscosity of from 10 to 5000 centipoise at 25° C., where the organo groups are monovalent hydrocarbon radicals, preferably of from 1 to 8 carbon atoms. Such linear diorganopolysiloxane polymers are useful as plasticizers. Preferably such plasticizers are free of silanol groups but usually there is present up to about 500 ppm of silanol groups. It is also preferable that the organo substituent groups are methyl and that the viscosity range from 10 to 1000 centipoise at 25° C.

In place of, or in addition to, the foregoing plasticizer it is desirable to further include in the room temperature vulcanizable composition of the present invention from 1 to 20 parts by weight of a fluid siloxane containing a high degree of trifunctionality, tetrafunctionality or a mixture of tri and tetrafunctionality. Generally such plasticizers comprise (i) from 25 to 60 mole percent of monoalkylsiloxy units, siloxy units, or mixtures thereof, (ii) from 1 to 6 mole percent of trialkylsiloxy units and (iii) from 34 to 74 mole percent of dialkylsiloxy units, and wherein said plasticizer fluid contains from about 0.1 to about 2 percent by weight of silicon bonded hydroxyl units.

Other compounds, for example, flame retardants such as platinum, may also be included in the composition of the present invention.

The compositions of the instant invention are formed by mixing the various ingredients together in the substantial absence of moisture. This mixing is carried out in the substantial absence of moisture because moisture will cause the ingredients to prematurely vulcanize. After mixing the composition is storage stable as long as moisture is prevented from contacting the composition. The physical properties of the composition will remain essentially unchanged for one year or more after packaging.

Compositions of this invention can also be utilized as a two component system. Such two component systems generally comprise as the basic ingredients an organopolysiloxane base polymer and a filler in one package, and an alkyl silicate crosslinking agent mixed with a condensation catalyst as the second package. The compositions prepared in this manner are stored as such and when it is desired to cure the composition the two packages are mixed together and cured to form a silicone elastomeric composition.

Room temperature vulcanizable silicone compositions of the instant invention can be used without further modification in a sealing, caulking, bonding or coating application by merely placing the composition in the desired place and permitting it to cure on exposure to the moisture in the atmosphere. The composition of this invention is placed on the surface to which it is to be bonded without any particular preparation or priming of the substrate other than simple cleaning. When exposed to moisture in the air the composition cures to an elastomer which is bonded to the substrate upon which it was placed.

The degree of bonding of a composition to a substrate depends upon the exact formulation of the room temperature vulcanizable silicone elastomer composition used and the type of substrate. The compositions of the present invention bond particularly well to glass and aluminum surfaces without any treatment of the surface other than cleaning.

When there is satisfactory bonding between a substrate surface such as glass and the bonding material, a mechanical stress on the bond area will cause the bonding material to rupture, leaving part of the bonding material still adhered to the substrate. This type of failure is referred to as cohesive failure. If the bond is not satisfactory, the mechanical stress will cause the bonding material to lose adhesion to the substrate and there will be no bonding material adhered to the substrate. This type of failure is referred to as adhesive failure.

Materials intended for use as adhesives, sealants, caulking compounds, coatings, and the like may be evaluated as to their bond to substrates by applying the material to the substrate to be tested, curing the material, and the peeling the material from the substrate. The force required to remove the material from the substrate and the type of adhesion failure form a basis for judging the usefulness of the material. Such tests may be performed on samples after they are cured and also after various types of exposures such as heating, immersion in liquids and such to stimulate the possible effects of expected use conditions.

The storage stable composition of this invention provides bonding without priming if used shortly after mixing or if used after storage in the absence of moisture, for longer periods such as up to a year or more.

The room temperature vulcanizable silicone elastomeric compositions of this invention are particularly useful for bonding and sealing applications where the bond must withstand the effects of exposure to water for long periods. These materials are especially useful in bonding aluminum and glass which will be exposed to water and which must maintain a bond when so exposed.

The following examples are illustrative only and should not be construed as limiting the present invention which is properly delineated in the claims. All parts are by weight unless otherwise noted.

EXAMPLE 1

The most preferred self-bonding agent for use in room temperature vulcanizable silicone compositions of the present invention having the formula

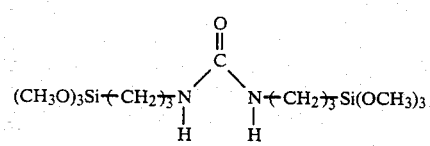

was prepared by the slow addition of an equimolar amount of γ-isocyanatopropyltrimethoxysilane to γ-aminopropyltrimethoxysilane. The addition of 20.5 grams of γ-isocyanatopropyltrimethoxysilane to 17.9 g of γ-aminopropyltrimethoxysilane was effected by adding five increments of about 4.1 g each. Each incremental addition of γ-isocyanatopropyltrimethoxysilane was accompanied with agitation of the reaction mixture by swirling. The reaction began at room temperature but during the additions, the temperature of the reaction mixture increased, reaching a maximum of about 98° C. shortly after completing the additions of γ-isocyanatopropyltrimethoxysilane. Thereafter, the temperature slowly fell to room temperature leaving a homogeneous, water-white viscous product. Infrared analysis of the product showed NH absorption at 3.45 microns, carbonyl absorption at 6.15 microns, and only a trace of NCO absorption at 4.65 microns, which is consistent with the above formula of the most preferred self-bonding agent.

EXAMPLE 2

The effectiveness of

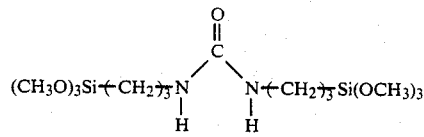

as an adhesion promoter or self-bonding agent in room temperature vulcanizable silicone compositions was evaluated by comparison with γ-aminoethylaminopropyltrimethoxysilane (AEAPTMS) which is a commercially successful self-bonding agent within the scope of U.S. Pat. No. 3,888,815 to Bessmer et al.

A base composition A was prepared by mixing 100 parts of a methyldimethoxy endstopped dimethylpolysiloxane having a viscosity of about 150,000 centipoise at 25° C.; 17 parts of octamethylcyclotetrasiloxane treated fumed silica; 20 parts of a trimethylsiloxy endstopped dimethylpolysiloxane plasticizer having a viscosity of about 100 centipoise at 25° C.; 10 parts of a plasticizer comprising 3 mole percent trimethylsiloxy monofunctional units, 20 mole percent methylsiloxy trifunctional units and 77 mole percent dimethylsiloxy difunctional units having a viscosity of about 50 centipoise at 25° C. and about 0.5% by weight silanol groups; 0.2 parts of a polyether sag control agent (Pluracol V-7 sold by Wyandotte Chemicals Corp.) and 3.5 parts of hexamethyldisilazane.

A room temperature vulcanizable composition was prepared from base composition A as follows:

| | |
|---|---|
| 100 parts | base Composition A |
| 1.0 part | self-bonding agent of Example 1 |
| 0.3 part | methyltrimethoxysilane crosslinking agent |
| 0.15 part | dibutyltindiacetate condensation catalyst. |

This composition had the following properties after curing in the presence of atmospheric moisture:

| | |
|---|---|
| Tack-free-time | 2 hours |
| Shore A | 11 |
| Tensile strength | 121 psi |
| Elongation | 583% |
| 75% Modulus | 27 |

The peel adhesion of the foregoing room temperature vulcanizable composition was measured on various substrates and compared with peel adhesions obtained for compounds which utilized AEAPTMS instead of the self-bonding agents of the instant invention:

| Substrate | Example 1 Self-bonding Agent lbs/per inch/% | AEAPTMS Self-bonding Agent cohesive failure |
|---|---|---|
| Glass | 50/100 | 63/95 |
| Al, anodized | 42/100 | 39/40 |
| Al, mill finished | 55/100 | 37/60 |
| Mylar | 0/0 | 0/0 |
| Concrete | 21/100 | 19/0 |
| Kynar | 49/100 | 45/100 |
| Anderson PVC | 54/100 | 35/80 |
| Steel | 35/70 | 40/80 |

From the foregoing it can be seen that the self-bonding agents of the present invention are substantially equivalent or slightly superior to that of the prior art for imparting primerless adhesion to room temperature vulcanizable silicone compositions.

We claim:

1. A composition which vulcanizes at room temperature on exposure to moisture comprising a product resulting from mixing:
   (A) an organopolysiloxane consisting essentially of repeating units of the formula

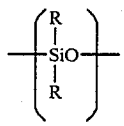

where R is a $C_{(1-13)}$ monovalent substituted or unsubstituted hydrocarbon radical and where the viscosity of said organopolysiloxane is at least 100 centipoise at 25° C.
   (B) an effective amount of condensation catalyst, and
   (C) an effective amount of self-bonding agent of the general formula

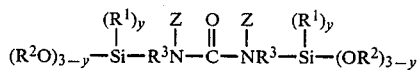

where $R^1$ is a $C_{(1-7)}$ monovalent hydrocarbon radical, $R^2$ is a $C_{(1-4)}$ alkyl radical, $C_{(1-4)}$ acyl radical or a radical of the formula $-CH_2CH_2O)_nR^4$, where n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical and y equals 0 or 1.

2. A composition in accordance with claim 1 wherein the terminal silicon atom at each chain end of organopolysiloxane (A) is terminated with at least two alkoxy radicals.

3. A composition in accordance with claim 1 wherein the condensation catalyst is a diorganotindicarboxylate.

4. A composition in accordance with claim 3 wherein the condensation catalyst is dibutyltindiacetate.

5. A composition in accordance with claim 1 wherein there is present from about 0.1 to about 10 parts by weight self-bonding agent per 100 parts by weight organopolysiloxane (A).

6. A composition in accordance with claim 1 wherein there are three $OR^2$ radicals bonded to each silicon atom of the self-bonding agent.

7. A composition in accordance with claim 6 wherein $R^2$ is a methyl or ethyl group.

8. A composition in accordance with claim 1 wherein $R^3$ is $-CH_2-_3$.

9. A composition in accordance with claim 1 wherein the self-bonding agent has the formula

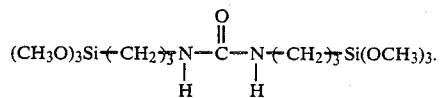

10. A composition in accordance with claim 1, further comprising an effective amount of crosslinking silane of the formula

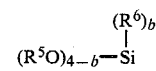

where $R^5$ is a $C_{(1-8)}$ aliphatic organic radical selected from the group consisting of alkyl, alkylether, alkylester, alkylketone and alkylcyano, or a $C_{(7-13)}$ aralkyl radical; $R^6$ is a $C_{(1-13)}$ monovalent substituted or unsubstituted hydrocarbon radical; and b equals 0 or 1.

11. A composition in accordance with claim 1, further comprising an effective amount of a scavenger for hydroxy functional groups.

12. A composition in accordance with claim 11 wherein the scavenger for hydroxy functional groups is hexamethyldisilazane, tetramethyldimethoxydisilazane, dimethyltetramethoxydisilazane or mixtures thereof.

13. A composition in accordance with claim 11 wherein the scavenger for hydroxy functional groups also functions as a crosslinking agent.

14. A composition in accordance with claim 1, further comprising an effective amount of filler.

15. A composition in accordance with claim 1, further comprising an effective amount of sag control agent.

16. A composition in accordance with claim 1, further comprising an effective amount of plasticizer.

17. A composition which vulcanizes at room temperature on exposure to moisture comprising a product resulting from mixing:
   (A) 100 parts by weight of an organopolysiloxane wherein the silicon atom at each polymer chain end is terminated with at least two alkoxy radicals; and wherein said organopolysiloxane consists essentially of repeating units of the formula

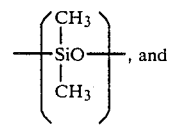, and where the viscosity is from about 50,000 to about 250,000 centipoise at 25° C.;
   (B) from about 0.001 to about 1 part by weight of condensation catalyst;
   (C) from about 0.1 to about 10 parts by weight of a self-bonding agent of the formula

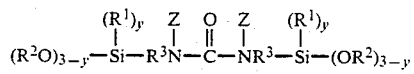

where $R^1$ is a $C_{(1-7)}$ monovalent hydrocarbon radical, $R^2$ is a $C_{(1-4)}$ alkyl radical, $C_{(1-4)}$ acyl radical or a radical of the formula $-CH_2CH_2O)_nR^4$, where n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical and y equals 0 or 1;

(D) 0 to 10 parts by weight of a crosslinking silane of the formula

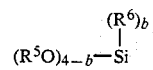

where $R^5$ is a $C_{(1-8)}$ aliphatic organic radical selected from the group consisting of alkyl, alkylether, alkylester, alkylketone and alkylcyano radicals, or a $C_{(7-13)}$ aralkyl radical; $R^6$ is a $C_{(1-13)}$ monovalent substituted or unsubstituted hydrocarbon radical; and b equals 0 or 1;

(E) an effective amount of scavenger for hydroxy functional groups;
(F) up to about 700 parts by weight filler;
(G) an effective amount of sag control agent; and
(H) an effective amount of plasticizer.

18. A method of making a room temperature vulcanizable silicone composition comprising mixing:
(A) an organopolysiloxane consisting essentially of repeating units of the formula

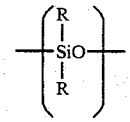

where R is a $C_{(1-13)}$ monovalent substituted or unsubstituted hydrocarbon radical and where the viscosity of said organopolysiloxane is at least 100 centipoise at 25° C.,
(B) an effective amount of condensation catalyst, and
(C) an effective amount of self-bonding agent of the general formula

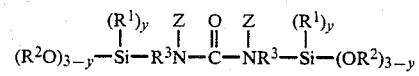

where $R^1$ is a $C_{(1-7)}$ monovalent hydrocarbon radical, $R^2$ is a $C_{(1-4)}$ alkyl radical, $C_{(1-4)}$ acyl radical or a radical of the formula $-CH_2CH_2O)_nR^4$, where n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical and y equals 0 or 1.

19. A method in accordance with claim 18, further comprising mixing an effective amount of crosslinking silane of the formula

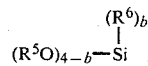

where $R^5$ is a $C_{(1-8)}$ aliphatic organic radical selected from the group consisting of alkyl, alkylether, alkylester, alkylketone and alkylcyano, or a $C_{(7-13)}$ aralkyl radical; $R^6$ is a $C_{(1-13)}$ monovalent substituted or unsubstituted hydrocarbon radical; and b equal 0 or 1.

20. A method in accordance with claim 18, further comprising mixing an effective amount of scavenger for hydroxy functional groups.

21. A method in accordance with claim 18, further comprising mixing an effective amount of filler.

22. A method in accordance with claim 18, further comprising mixing an effective amount of sag control agent.

23. A method in accordance with claim 18, further comprising mixing an effective amount of plasticizer.

24. A method in accordance with claim 18 wherein mixing is effected in the substantial absence of moisture.

25. A method for making a room temperature vulcanizable silicone composition which is storage stable comprising mixing in the substantial absence of moisture:
(A) 100 parts by weight of an organopolysiloxane wherein the silicon atom at each polymer chain end is terminated with at least two alkoxy radicals and wherein said organopolysiloxane consists essentially of repeating units of the formula

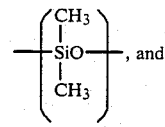, and where the viscosity is from about 50,000 to about 250,000 centipoise at 25° C.;
(B) from about 0.001 to about 1 part by weight of condensation catalyst;
(C) from about 0.1 to about 10 parts by weight of a self-bonding agent of the formula

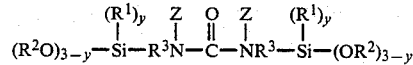

where $R^1$ is a $C_{(1-7)}$ monovalent hydrocarbon radical, $R^2$ is a $C_{(1-4)}$ alkyl radical, $C_{(1-4)}$ acyl radical or a radical of the formula $-CH_2CH_2O)_nR^4$, where n is 1 or 2 and $R^4$ is a $C_{(1-4)}$ alkyl radical, $R^3$ is a $C_{(1-18)}$ divalent hydrocarbon radical free of aliphatic unsaturation attached to a nitrogen atom of the urea nucleus through a non-aromatic carbon atom, Z is hydrogen or a $C_{(1-4)}$ alkyl radical, and y equals 0 or 1;

(D) 0 to 10 parts by weight of crosslinking silane of the formula

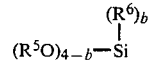

where $R^5$ is a $C_{(1-8)}$ aliphatic organic radical selected from the group consisting of alkyl, alkylether, alkylester, alkylketone and alkylcyano radicals, or a $C_{(7-13)}$ aralkyl radical; $R^6$ is a $C_{(1-13)}$ monovalent substituted or unsubstituted hydrocarbon radical; and b equals 0 or 1;

(E) an effective amount of scavenger for hydroxy functional groups;
(F) up to about 700 parts by weight filler;
(G) an effective amount of sag control agent; and
(H) an effective amount of plasticizer.

* * * * *